(12) United States Patent
Fujita et al.

(10) Patent No.: US 8,041,475 B2
(45) Date of Patent: Oct. 18, 2011

(54) ELECTRIC PARKING BRAKE SYSTEM AND METHOD FOR CONTROLLING THE SAME

(75) Inventors: Kozo Fujita, Nishikamo-gun (JP);
Tomohiro Yamashita, Toyota (JP);
Hideo Kondo, Aichi-gun (JP); Hidehiro Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 371 days.

(21) Appl. No.: 12/076,915

(22) Filed: Mar. 25, 2008

(65) Prior Publication Data
US 2008/0262687 A1    Oct. 23, 2008

(30) Foreign Application Priority Data
Apr. 20, 2007  (JP) .................................. 2007-111734

(51) Int. Cl.
*G01M 17/00* (2006.01)
*G06F 19/00* (2011.01)
*G06F 7/00* (2006.01)
*B60T 8/32* (2006.01)
*B60T 7/12* (2006.01)
*B60R 16/02* (2006.01)

(52) U.S. Cl. .............. 701/29; 701/36; 701/70; 303/191; 307/10.6; 318/370

(58) Field of Classification Search ................ 701/1, 29, 701/34, 36, 45, 48, 51, 53, 70; 303/3, 121, 303/191; 307/10.1, 10.6, 9.1; 188/156–158; 318/370; 477/92, 93, 96, 97, 99, 114, 182–184, 477/188, 190, 194, 197, 199
See application file for complete search history.

(56) References Cited

U.S. PATENT DOCUMENTS

| | | | | |
|---|---|---|---|---|
| 5,180,038 A * | 1/1993 | Arnold et al. | ................. | 188/171 |
| 5,957,246 A * | 9/1999 | Suzuki | ......................... | 188/72.1 |
| 6,139,117 A * | 10/2000 | Shirai et al. | ....................... | 303/3 |
| 6,293,363 B1 * | 9/2001 | Rangaswamy et al. | ....... | 180/287 |
| 6,663,195 B1 * | 12/2003 | Arnold | ..................... | 303/122.03 |
| 6,701,242 B1 * | 3/2004 | Diebold | .......................... | 701/70 |
| 7,140,697 B2 * | 11/2006 | Koga et al. | ..................... | 303/20 |

FOREIGN PATENT DOCUMENTS

| | | |
|---|---|---|
| DE | 2 035 349 | 1/1972 |
| DE | 199 62 556 A1 | 7/2001 |
| JP | A 2001-106047 | 4/2001 |
| JP | A 2001-106057 | 4/2001 |
| JP | A 2001-106058 | 4/2001 |
| JP | A 2004-142522 | 5/2004 |
| JP | A 2006-160203 | 6/2006 |

* cited by examiner

*Primary Examiner* — Tuan C To
*Assistant Examiner* — Edward Pipala
(74) *Attorney, Agent, or Firm* — Oliff & Berridge, PLC

(57) ABSTRACT

An electric parking brake system includes an electric parking brake mechanism that includes a brake which suppresses rotation of a wheel and an electric motor which applies or releases the brake, and that maintains a vehicle at a standstill while the brake is applied. A parking switch selectively outputs an application command for applying the brake and a release command for releasing the brake in response to an operation of an operating portion for the parking switch. A parking switch malfunction determination unit determines whether the parking switch malfunctions, and a parking brake automatic control unit automatically applies the brake by operating the electric motor when an ignition switch of the vehicle is turned off in response to an operation of an operating portion for the ignition switch, in a case where the parking switch malfunction determination unit determines that the parking switch malfunctions.

8 Claims, 10 Drawing Sheets

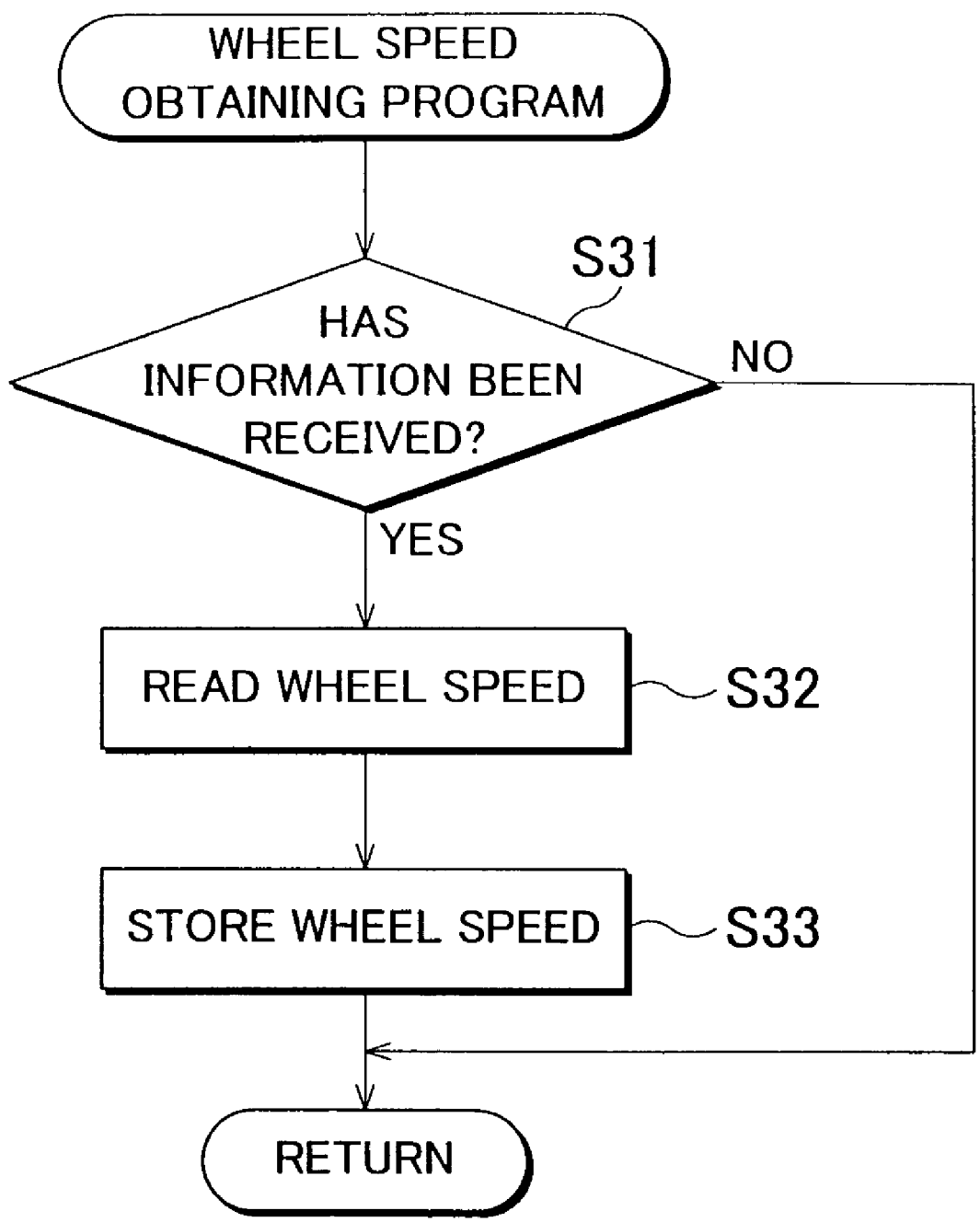

ELECTRIC PARKING BRAKE SYSTEM AND METHOD FOR CONTROLLING THE SAME

INCORPORATION BY REFERENCE

The disclosure of Japanese Patent Application No. 2007-111734 filed on Apr. 20, 2007 including the specification, drawings and abstract is incorporated herein by reference in its entirety.

BACKGROUND

1. Field of the Invention

The invention relates to a control that is executed over an electric parking brake system when a parking switch malfunctions, and a method for executing the control.

2. Description of Related Art

Japanese Patent Application Publication No. JP-2001-106047 (JP-A-2001-106047) describes a technology related to an electric parking brake system for a vehicle including a manual transmission. According to JP-A-2001-106047, when an ignition switch is turned off, brakes are automatically applied. Japanese Patent Application Publication No. JP-2001-106057 (JP-A-2001-106057) describes automatically applying brakes when a parking switch malfunctions and a vehicle is at a standstill. Japanese Patent Application Publication No. JP-2001-106058 (JP-A-2001-106058) describes automatically applying or releasing brakes in response to operations including an operation of an operating portion for an ignition switch when a parking switch malfunctions. Each of Japanese Patent Application Publication No. JP-2006-160203 (JP-A-2006-160203) and Japanese Patent Application Publication No. JP-2004-142522 (JP-A-2004-142522) describes providing a redundant detection circuit for a parking switch. When an application operating portion or a release operating portion is operated, the states of two switches are changed in response to the operation, and whether the parking switch malfunctions is determined based on the states of these two switches.

SUMMARY OF THE INVENTION

A first aspect of the invention relates to an electric parking brake system. The system includes an electric parking brake mechanism that includes a brake which suppresses rotation of a wheel and an electric motor which applies or releases the brake, and that maintains a vehicle at a standstill while the brake is applied. The system also includes: (1) a parking switch that selectively outputs an application command for applying the brake and a release command for releasing the brake in response to an operation of an operating portion for the parking switch; (2) a parking switch malfunction determination unit that determines whether the parking switch malfunctions; and (3) a parking brake automatic control unit that automatically applies the brake by operating the electric motor, when an ignition switch of the vehicle is turned off in response to an operation of an operating portion for the ignition switch, in the case where the parking switch malfunction determination unit determines that the parking switch malfunctions.

According to the first aspect of the invention, the brake is automatically applied when the operating portion for the ignition switch is operated to turn off the ignition switch. Therefore, the brake is applied less frequently. As a result, it is possible to avoid the situation in which the brake is applied against the driver's intention.

A second aspect of the invention relates to a vehicle that includes the electric parking brake system according to the first aspect of the invention and a manual transmission.

A third aspect of the invention relates to a vehicle that includes the electric parking brake system according to the first aspect of the invention and an automatic transmission.

A fourth aspect of the invention relates to an electric parking brake system that includes an electric parking brake mechanism that includes a brake which suppresses rotation of a wheel and an electric motor which applies or releases the brake, and that maintains a vehicle at a standstill while the brake is applied. The system also includes: (1) a parking switch that selectively outputs an application command for applying the brake and a release command for releasing the brake in response to an operation of an operating portion for the parking switch; (2) a parking switch malfunction determination unit that determines whether the parking switch malfunctions; and (3) a parking brake automatic control unit that automatically applies the brake when the parking switch malfunction determination unit determines that the parking switch malfunctions.

In the fourth aspect of the invention, the parking brake automatic control unit may automatically apply the brake when an ignition switch of the vehicle is off and the vehicle is at a standstill in the case where the parking switch malfunction determination unit determines that the parking switch malfunctions.

According to the fourth aspect of the invention described above, when it is determined that the parking switch malfunctions, a parking brake is controlled based on the control state of a drive power source. When the drive power source is being controlled (when the drive power source is operative), the parking brake is not automatically applied. On the other hand, when the drive power source is not being controlled (when the drive power source is not operative), the parking brake is automatically applied. Namely, when it is determined that the parking switch malfunctions, the parking brake is controlled based on the information from a drive control unit. The parking brake is not applied when the information that the drive power source control program is executed, or the information that the ignition switch is on is provided. On the other hand, the parking brake is applied when the information that the drive power source control program is not executed, or the information that the ignition switch is off is provided. The electric parking brake system according to the fourth aspect of the invention described above may be applied to a vehicle including an automatic transmission.

A fifth aspect of the invention relates to a method for controlling an electric parking brake system including a brake that suppresses rotation of a wheel and an electric motor that applies or releases the brake, wherein the vehicle is maintained at a standstill when the brake is applied. The method includes: (1) selectively outputting an application command for applying the brake and a release command for releasing the brake in response to an operation of an operating portion for a parking switch; (2) determining whether the parking switch malfunctions; and (3) automatically applying the brake by operating the electric motor, when an ignition switch of the vehicle is turned off in response to an operation of an operating portion for the ignition switch in the case where it is determined that the parking switch malfunctions.

BRIEF DESCRIPTION OF THE DRAWINGS

The foregoing and further objects, features and advantages of the invention will become apparent from the following description of an exemplary embodiment with reference to the accompanying drawings, wherein the same or corresponding portions will be denoted by the same reference numerals and wherein:

FIG. 9 is a flowchart showing functions performed by a wheel speed obtaining program stored in the storage unit according to the embodiment of the invention;

DETAILED DESCRIPTION

Figure 1:
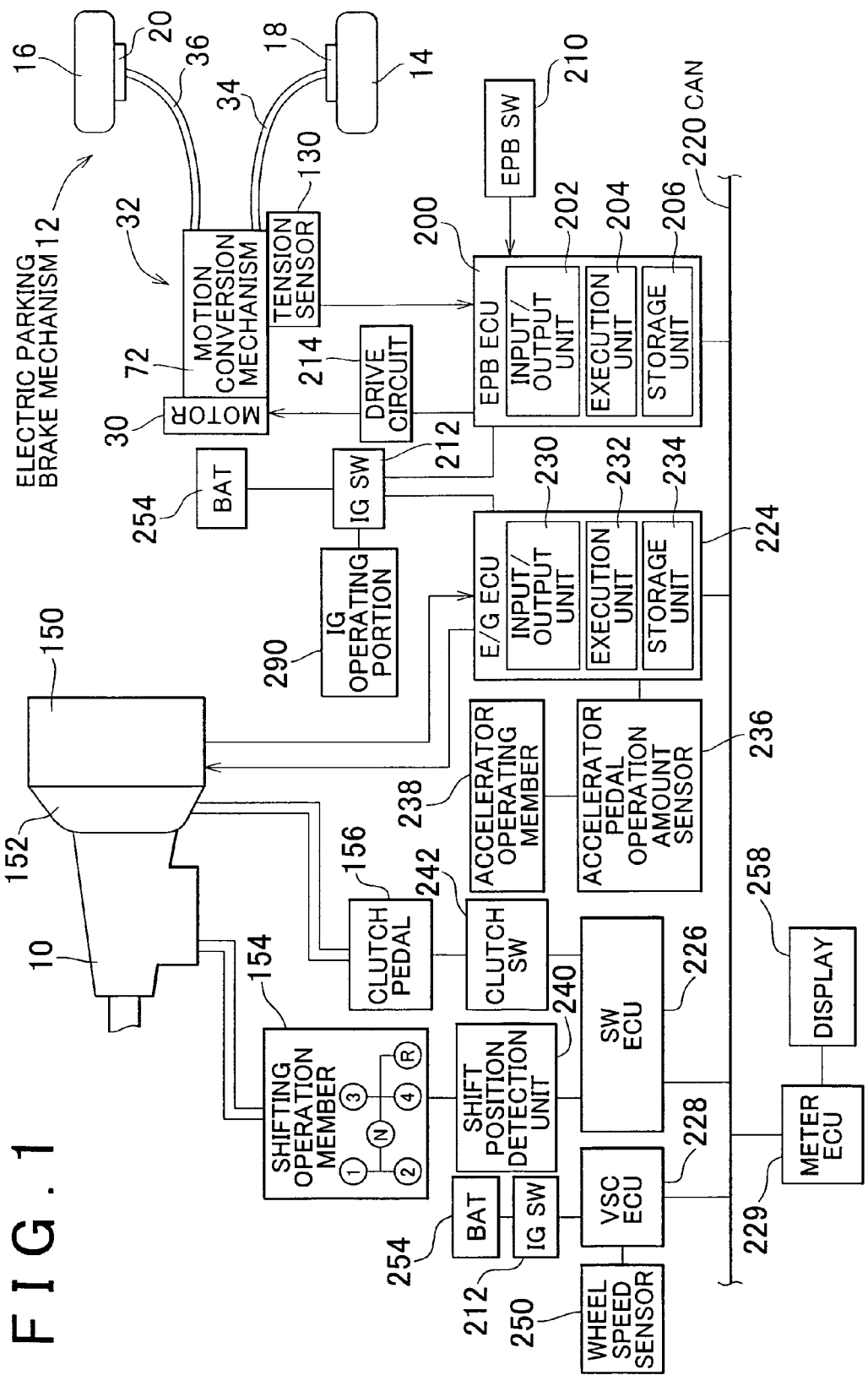
FIG. 1 is a view showing a vehicle including an electric parking brake system according to an embodiment of the invention.

An electric parking brake system according to an embodiment of the invention is mounted in a vehicle including a manual transmission. Gears of a manual transmission are changed (a gear train between an output shaft of a drive power source and an output shaft of the transmission is changed) in response to an operation of a shifting operation member performed by a driver. A manual transmission differs from an automatic transmission of which gears are automatically changed in accordance with a vehicle traveling speed, etc. without an operation of a shifting operation member performed by a driver. Manual transmissions are split into two groups. A manual transmission that belongs to one group is mechanically connected to a shifting operation member that is operated by a driver, and gears are changed in response to an operation of the shifting operation member. A manual transmission that belongs to the other group is not mechanically connected to a shifting operation member. However, the operation position of the shifting operation member is detected based on an electric signal, and gears are changed according to an electric control (for example, by operating an electric motor) based on the detected operation position. When gears are changed, a clutch that is disposed between a drive power source and the transmission is disengaged. Clutches are also split into two groups. A clutch that belongs to one group is connected to a clutch engaging/disengaging member, for example, a clutch pedal. A clutch that belongs to the other group is not connected to a clutch engaging/disengaging member. When a clutch is connected to a clutch engaging/disengaging member, the clutch is connected to the clutch engaging/disengaging member, for example, via a wire or hydraulically. When a clutch is not connected to a clutch engaging/disengaging member, the operating state of the clutch engaging/disengaging member is detected, and the clutch is disengaged or engaged according to an electric control executed based on the detection result.

An electric parking brake mechanism includes: an electric motor, brakes, a drive power transfer unit that transfers drive power produced by the electric motor to the brakes, and an application-state keeping mechanism that keeps the brakes applied even if electric currents are not supplied to the electric motor. Many types of drive power transfer units include cables. Some application-state keeping mechanisms include a clutch mechanism that changes the power transfer state between the state in which power transfer between an electric motor and brakes is permitted, and the state in which power transfer from the electric motor to the brakes is interrupted. Other application-state keeping mechanisms include a worm and a worm gear. When an ultrasonic motor is used as the electric motor, the ultrasonic motor also serves as the application-state keeping mechanism. Hereinafter, the brakes included in the electric parking brake mechanism will be referred to as parking brakes.

The state of a parking switch is changed in response to an operation of an operating portion for the parking switch. The parking switch then outputs an application command or a release command based on the operation. When the parking switch is not operated, neither an application command nor a release command may be output, or a command that is output based on the immediately preceding operation may be continuously output. A malfunction in the parking switch means that there is a situation in which the state of the parking switch is not changed even when the operating portion is operated, in other words, the situation in which neither an application command nor a release command is output even though the operating portion is operated. In the electric parking brake system according to the exemplary embodiment of the invention, when it is determined that a parking switch malfunctions, operation (application or release) of parking brakes based on the state of the parking switch is not performed in an electric parking brake mechanism. When the parking switch malfunctions, it is determined whether an operating portion for an ignition switch has been operated to turn off an ignition switch. If it is determined that the operating portion has been operated to turn off the ignition switch, electric currents are supplied to an electric motor to apply the parking brakes.

It is determined whether the operating portion has been operated to turn off the ignition switch based on a signal from a detection circuit that detects the on/off state of the ignition switch (including a portion having a state that is electrically changed, for example, a transistor, or a contact switch having a state that is changed between the off state (open state) and the on state (close state) of which the state is changed in response to an operation of the operating portion. However, the method for determining whether the operating portion has been operated to turn off the ignition switch is not limited to this particular method. For example, whether an operation for turning off the ignition switch has been performed can be determined based on whether a drive power source of a vehicle is in a controlled state, as described later in detail. The parking brakes may be automatically applied (the electric motor may be started) immediately after it is determined that an operation for turning off the ignition switch has been performed, or may be applied after the reliability of the result of determination that the ignition switch has been turned off becomes high.

In a vehicle including an automatic transmission, a parking lock mechanism is usually provided. When a shifting operation member is moved to the parking position, the parking lock mechanism is operated, and rotation of a drive power transfer shaft is interrupted. Accordingly, even if parking brakes are not applied, the vehicle is maintained at a standstill. In contrast, in a vehicle including a manual transmission, a parking lock mechanism usually is not provided. Accordingly, to maintain the vehicle at a standstill without using service brakes when parking brakes are not applied, friction of an engine is used. When the vehicle is at a standstill on a downhill slope, Reverse (R) is selected as the shift position to cause the engine to generate friction. When the vehicle is at a standstill on an uphill slope, Low (first gear) is selected as the shift position to cause the engine to generate friction. However, in a vehicle including an engine that has a small number of cylinders or a vehicle including an engine that is designed in such a manner that only small friction is generated, it is difficult to appropriately maintain the vehicle at a standstill on a slope when the parking brakes are not applied. In contrast, if a control is executed so that parking brakes are automatically applied when an operating portion for an ignition switch has been operated to turn off the ignition switch, it is possible to apply brakes against the driver's intention even if a parking switch malfunctions in a vehicle including a manual transmission. As a result, it is possible to maintain the vehicle at a standstill.

However, as in an electric parking brake system described in JP-A-2001-106057, when a parking switch malfunctions, if parking brakes are automatically applied every time a vehicle is stopped, the frequency at which the parking brakes are applied becomes high, which is unfavorable. Especially, in a cold district, when the parking brakes in an electric parking brake mechanism are applied against a driver's intention, if a part of a drive power transfer unit that transfers the driver power produced by an electric motor to the parking brakes, brake applying units, etc. are frozen, the parking brakes are not easily released. Especially, if the parking brakes are kept applied when the vehicle is stopped at an intersection, traffic congestion may be caused. In contrast, in the electric parking brake system according to the exemplary embodiment of the invention, when the operating portion for the ignition switch has been operated to turn off the ignition switch, the brakes are automatically applied. Therefore, the brakes are applied less frequently, which makes it possible to avoid the situation in which the parking brakes are applied against the driver's intention.

Hereafter, the electric parking brake system according to the exemplary embodiment of the invention will be described with reference to the accompanying drawings. As shown in FIG. 1, the electric parking brake system according to the embodiment of the invention is provided in a vehicle including a manual transmission 10. The electric parking brake system includes an electric parking brake mechanism 12. As shown in FIGS. 1 to 4, the electric parking brake mechanism 12 includes brakes 18 and 20 that are provided to a rear left wheel 14 and a rear right wheel 16 of the vehicle, respectively, and a pushing unit 32 that includes a motor 30 for a brake (electric motor) (hereinafter, referred to as "brake motor 30"). Cables 34 and 36 are pulled in response to an operation of the brake motor 30, whereby the brakes 18 and 20 are applied.

Figure 4:
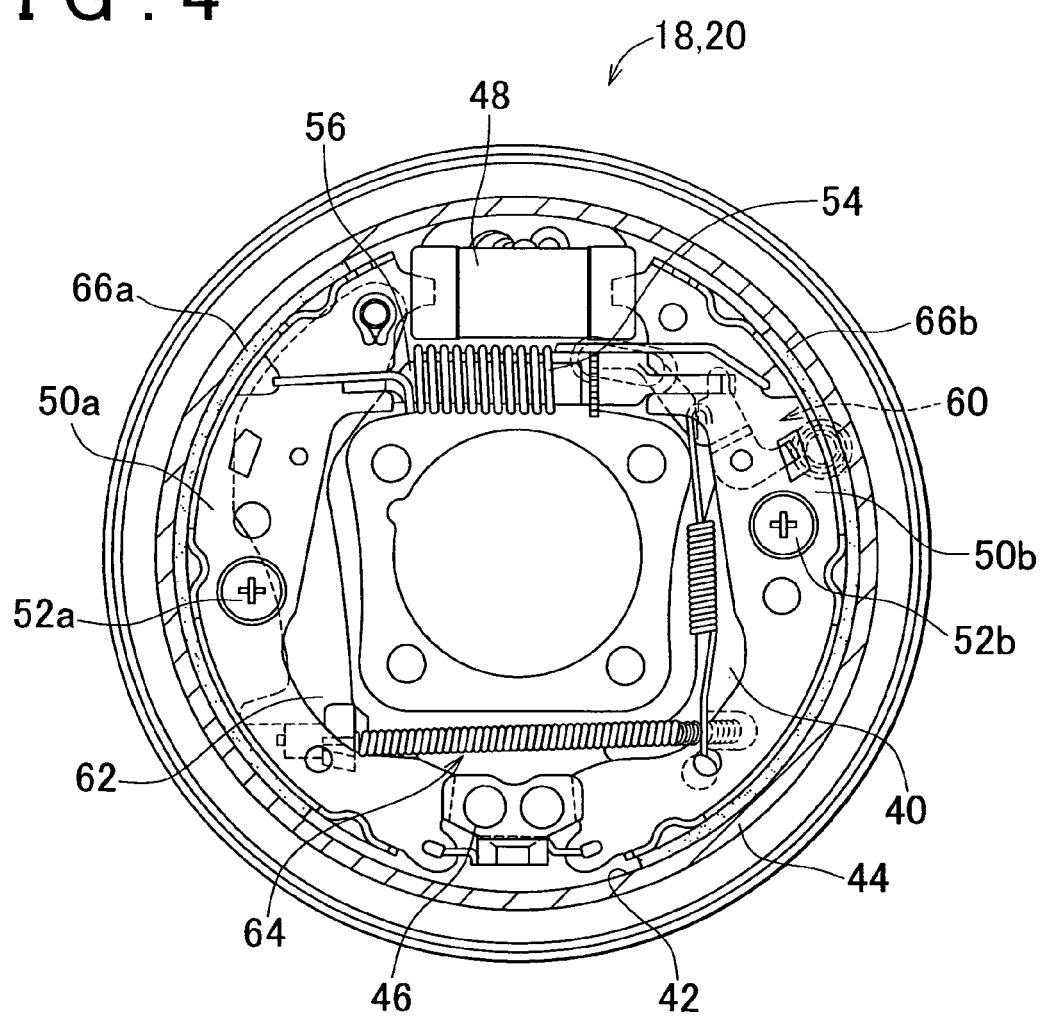
FIG. 4 is a front view showing a brake included in the electric parking brake system according to the embodiment of the invention.

In the exemplary embodiment of the invention, the brakes 18 and 20 are drum brakes that serve as friction brakes, as shown in FIG. 4. The drum brakes 18 and 20 have the same structure. The drum brakes 18 and 20 each include a backing plate 40, which is a non-rotating body that is fitted to a vehicle body (not shown), and a drum 44 that has an inner peripheral face 42 that has the friction face and that serves as a brake rotating body which is able to rotate together with the wheel 14 (16).

An anchor member 46 and a brake cylinder 48 are provided at positions that are apart from each other in the radial direction of the backing plate 40. The anchor member 46 is fixed to the backing plate 40. Between the anchor member 46 and the brake cylinder 48, paired brake shoes 50a and 50b, each of which has an arc-shape, are arranged so as to face the inner peripheral face 42 of the drum 44. The brake shoes 50a and 50b are fitted to the backing plate 40 by shoe hold-down units 52a and 52b so as to be movable along the face of the backing plate 40. An axle shaft (not shown) passes through a through-hole that is formed at the center of the backing plate 40.

The brake shoes 50a and 50b are operatively connected to each other, at one end, by the brake cylinder 48, and contact, at the other end, to the anchor member 46 to be pivotally supported. Biasing forces are applied to the brake shoes 50a and 50b by a return spring 54 so that the one end of the brakes shoes 50a and 50b approach each other. A strut 56 is provided between the brake shoes 50a and 50b. An automatic adjuster 60 is provided to each of the drum brakes 18 and 20 to automatically adjust a clearance between the brake shoes 50a and 50b, and the inner peripheral face 42 of the drum 44.

A brake lever 62, which serves as a brake operating member, is held, at one end, by the brake shoe 50a, and is connected, at the other end, to an inner cable 64 of the brake cable 34 (36) (see FIG. 1: hereinafter, referred to as "cable"). When the inner cable 64 is pulled, the brake lever 62 pivots. The pivot motion of the brake lever 62 increases the distance between the brakes shoes 50a and 50b, whereby brake linings 66a and 66b are pushed against the inner peripheral face 42 of the drum 44. As a result, the drum brake 18 (20), which serves as the parking brake, is applied. The force with which the brake linings 66a and 66b are pushed against the inner peripheral face 42 corresponds to the force with which the inner cable 64 is pulled. Meanwhile, when hydraulic pressure is supplied to the brake cylinder 48, the distance between the brake shoes 50a and 50b is increased, whereby the brake linings 66a and 66b are pushed against the inner peripheral face 42 of the drum 44. As a result, the drum brake 18 (20), which serves as the service brake, is applied. Hereinafter, the drum brakes 18 and 20 will be referred to as the parking brakes 18 and 20, where appropriate.

Figure 2:
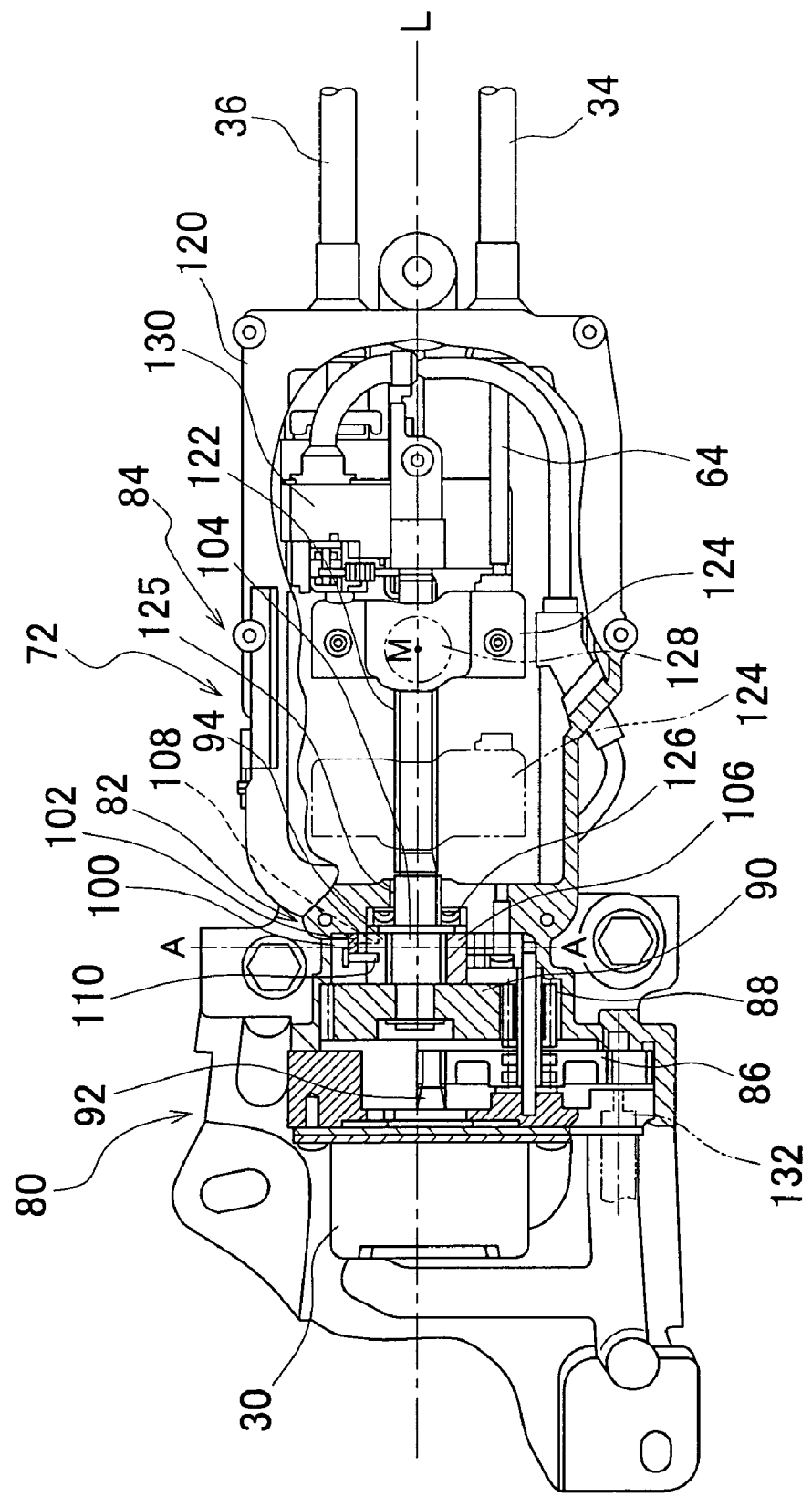
FIG. 2 is a cross-sectional view showing a motion-conversion mechanism included in the electric parking brake system according to the embodiment of the invention.

Each of the cables 34 and 36 is connected, at a portion that projects from an end of an outer tube of the inner cable 64 toward the brake, to the brake lever 62. In addition, each of the cables 34 and 36 is connected, at another portion that projects from the other end of the outer tube, to a clutch-equipped motion-conversion mechanism 72. The clutch-equipped motion-conversion mechanism 72 converts rotation of the brake motor 30 into a linear motion, and transfers the drive power produced by the brake motor 30 to the cables 34 and 36. As shown in FIG. 2, the clutch-equipped motion-conversion mechanism 72 includes a gear train 80, a clutch 82, which serves as a retention mechanism, a screw mechanism 84, etc.

The gear train 80 is formed of multiple gears 86, 88, and 90. The gear 86 is meshed with an output shaft 92 of the brake motor 30, and rotation of the gear 86 is transferred to the gear 90. A drive power transfer unit 94, which projects in the axial direction of the clutch-equipped motion-conversion mechanism 72, is fitted to the end face of the gear 90, which is opposite to the brake motor 30.

Figure 3:
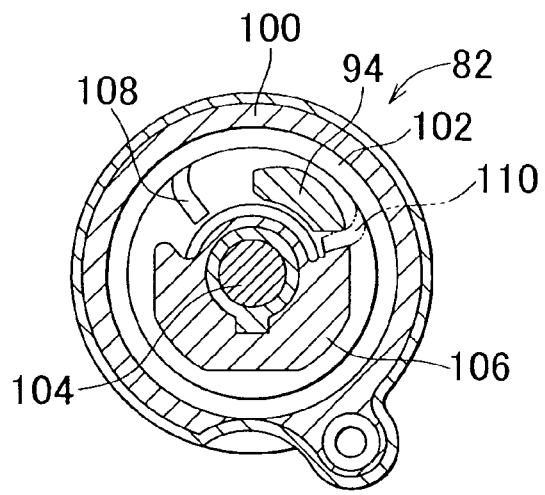
FIG. 3 is a cross-sectional view showing a clutch included in the motion-conversion mechanism according to the embodiment of the invention.

The clutch 82 is a one-way clutch. As shown in FIG. 3, the clutch 82 includes a housing 100, a coil spring 102, which is provided on the inner peripheral side of the housing 100, and a rotor 106 that is able to rotate together with an output shaft 104 of the clutch 82. The coil spring 102 is fitted to the housing 100 with its diameter elastically compressed slightly. The outer peripheral face of the coil spring 102 is closely fitted to the inner peripheral face of the housing 100, and end portions 108 and 110 of wires project toward the center of the clutch 82. The drive power transfer unit 94 of the gear 90 is positioned in one of the two spaces defined by the two end portions 108 and 110, and the rotor 106 is positioned in the other space.

When the gear 90 rotates in accordance with rotation of the brake motor 30, the drive power transfer unit 94 contacts one of the end portions 108 and 110, and the coil spring 102 is compressed, whereby frictional force between the inner peripheral face of the housing 100 and the outer peripheral face of the spring 102 decreases. This enables the coil spring 102 and the rotor 106 to rotate. Then, the output shaft 104 rotates. The output shaft 104 rotates together with the gear 90. Therefore, rotation of the brake motor 30 is transferred to the output shaft 104 by the clutch 82.

If torque is applied to the output shaft 104 under the condition where electric currents are not supplied to the brake motor 30 (under the condition where the brake motor 30 is not operating), the rotor 106 contacts one of the end portions 108 and 110. Thus, the diameter of the coil spring 102 is increased. Thus, frictional force between the outer peripheral face of the coil spring 102 and the inner peripheral face of the housing 100 increases. This interrupts rotation of the coil spring 102. Transfer of torque from the output shaft 104 to the gear 90 is interrupted by the clutch 82. Under the condition where electric currents are not supplied to the brake motor 30, the torque applied to the output shaft 104 does not rotate the brake motor 30.

The screw mechanism 84 includes a housing 120, a male screw member 122 that extends in the direction parallel to the axis line L, a nut (not shown) that is screwed with the male screw member 122, and an equalizer 124 that is fitted to the nut so as to be pivotal about the axis line M. The male screw member 122 is supported by the housing 120 via paired radial bearings 125 (one of the radial bearings 125 is not shown), and a needle thrust bearing 126 in such a manner that the male screw member 122 is rotatable relative to the housing 120. The inner cable 64 of the cable 34 and the inner cable 64 of the cable 36 are coupled with respective arms of the equalizer 124. An engaging projection portion 128 is formed on a main body of the equalizer 124, and is engaged with a guide (not shown) that is provided to the housing 120 and that extends in the direction parallel to the axis line L. As a result, the equalizer 124 is not able to rotate about the axis line L with respect to the housing 120, but is able to move relative to the housing 120 in the direction parallel to the axis line L and pivot about the engaging projection portion 128 (about the axis line M).

The equalizer 124 is movable relative to the housing 120, between the position indicated by the solid lines and the position indicated by the chain double-dashed lines. The inner cables 64 of the cables 34 and 36 are pulled or slackened in accordance with the relative movement of the equalizer 124. The equalizer 124 pivots about the engaging projection portion 128 (about the axis line M) so that the tensions applied to the inner cables 64 of the two cables 34 and 36 (hereinafter, referred to as "tensions of the cables 34 and 36" where appropriate) are equal to each other. A tension sensor 130 that detects the tension applied to the inner cable 64 of the cable 36 is provided in the housing 120. Because the tensions applied to the cables 34 and 36 are equalized by the equalizer 124, the tension of the cable 36 detected by the tension sensor 130 is equal to the tension of the cable 34.

For example, when the brake motor 30 malfunctions, a malfunction-time brake release unit 132 releases the parking brakes 18 and 20. In the exemplary embodiment of the invention, the brakes 18 and 20, the brake motor 30, the clutch-equipped motion-conversion mechanism 72, the cables 34 and 36, etc. form the electric parking brake mechanism 12. In the exemplary embodiment of the invention, the motion-conversion mechanism 72 includes the clutch 82. However, it is not absolutely necessary to provide the clutch 82 in the motion-conversion mechanism 72. When the motion-conversion mechanism 72 includes a worm and a worm gear, the same function is exhibited.

The manual transmission 10 is coupled with an engine 150, which serves as a drive power source for a vehicle, via a clutch 152, as shown in FIG. 1. The driving torque output from an output shaft of the manual transmission 10 is transferred to drive wheels. The drive wheels may be front left and right wheels (the vehicle may be a front-wheel drive vehicle), rear left and right wheels 14 and 16 (the vehicle may be a rear-wheel drive vehicle), or front left and right and rear left and right wheels (the vehicle may be a four-wheel drive vehicle).

A shifting operation member 154 is coupled with the manual transmission 10, and a clutch pedal 156 is coupled with the clutch 152. The clutch 152 is disengaged when the clutch pedal 156 is depressed, and is engaged when the clutch pedal 156 is fully released. Under the condition where the clutch 152 is disengaged, if the shifting operation member is operated, gears of the transmission 10 are changed in response to the operation of the shifting operation member 154. In other words, the gear train between an output shaft of the engine 150 and the output shaft of the transmission 10 is changed. The vehicle including the manual transmission 10 according to the exemplary embodiment of the invention is not provided with a parking lock mechanism. That is, a mechanism that mechanically interrupts rotation of the output shaft of the transmission 10 (drive power transfer shaft) is not provided.

As shown in FIG. 1, the brake motor 30 of the electric parking brake mechanism 12 is controlled according to a command from an electric parking brake ECU (EPBECU) 200. The electric parking brake ECU 200 is mainly formed of a computer, and includes an input/output unit 202, an execution unit 204, a storage unit 206, etc. A parking brake switch (EPBSW: hereinafter, referred to as "parking switch") 210, the tension sensor 130, an ignition switch 212, etc. are connected to the input/output unit 202. The brake motor 30 is also connected to the input/output unit 202 via a drive circuit (including switches, etc.) 214.

Multiple computers such as an engine ECU (E/GECU) 224, a switch ECU (SWECU) 226, a skid control ECU (VSCECU) 228, and a meter ECU 229 are connected to the electric parking brake ECU 200 via a CAN (Car Area Network).

The engine ECU 224 includes an input/output unit 230, an execution unit 232, a storage unit 234, etc. The ignition switch 212, an accelerator pedal operation amount sensor 236, etc. are connected to the input/output unit 230. The accelerator pedal operation amount sensor 236 detects the operation amount (depression amount) of an accelerator operating member 238. The engine ECU 224 controls the engine 150 based on the accelerator pedal operation amount, the vehicle traveling speed, etc. while the ignition switch 212 is on.

Multiple sensors, which detect the operating state of the engine 150, are connected to the input/output unit 230. The operating state of the engine 150 is detected by these sensors.

Similarly, the switch ECU 226 includes an input/output unit, an execution unit, a storage unit, etc. The switch ECU 226 detects the operating states of the multiple switches provided to the vehicle and the operating members, and outputs the information indicating the operating states. A shift position detection unit 240, a clutch switch 242, etc. are connected to the input/output unit of the switch ECU 226. As shown in FIG. 1, the shifting operation member 154 changes the shift position among Low (first gear: 1), Second (second gear: 2), Neutral (N), Third (third gear: 3), Top (fourth gear: 4), and Reverse (R). The operation position of the shifting operation member 154 is detected by the shift position detection unit 240, and the information indicating the shift position is provided to the electric parking brake ECU 200 via the CAN 220. The clutch switch 242 detects the depression state of the clutch pedal 156. The information indicating the depression state, that is, whether the clutch 152 is disengaged or engaged, is provided to the electric parking brake ECU 200 via the CAN 220.

Similarly, the skid control ECU 228 includes an input/output unit, an execution unit, a storage unit, etc. The skid control ECU 228 controls braking force of a service brake (not shown). Wheel speed sensors 250, which detect the wheel speeds of the front right wheel, the front left wheel, the rear right wheel and the rear left wheel, are connected to the input/output unit of the skid control ECU 228. The wheel speeds are obtained from the wheel speed sensors 250 based on predetermined trigger signals. Signals indicating the detected wheel speeds are transmitted to the CAN 220, and provided to the electric parking brake ECU 200, the engine ECU 224, etc. A battery 254, which serves as an electric power source, is connected to the engine ECU 224 via the ignition switch 212. Therefore, the wheel speeds are detected when the ignition switch 212 is on, whereas the wheel speeds are not detected when the ignition switch 212 is off. When the ignition switch 212 is off, the information indicating the wheel speeds is not output to the CAN 220.

The information indicating the wheel speeds of the front right wheel, the front left wheel, the rear right wheel, and the rear left wheel may be output to the CAN 220, or the information indicating the maximum value or the average value of these wheel speeds may be output to the CAN 220. Alternatively, the estimated vehicle body speed may be calculated by the skid control ECU 228 based on the wheel speeds, and the information indicating the estimated vehicle body speed may be output to the CAN 220. The meter ECU 229 controls a display 258 provided in an instrument panel of the vehicle. The display 258 is controlled and various types of information are indicated on the display 258, while the ignition switch 212 is on.

Figure 5:
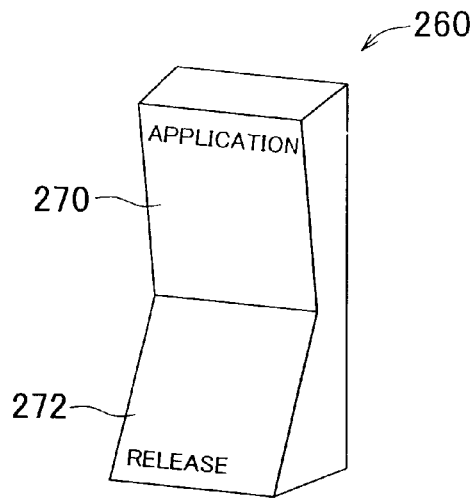
FIG. 5 is a perspective view showing an operating portion for a parking switch included in the electric parking brake system according to the embodiment of the invention.

The state of the parking switch 210 is changed in response to an operation of a switch operating member 260 shown in FIG. 5. The switch operating member 260 includes an application operating portion 270 and a release operating portion 272. When the application operation portion 270 is pressed, an application command (a command to apply the parking brakes 18 and 20) is issued. When the release operating portion 272 is pressed, a release command (a command to release the parking brakes 18 and 20) is issued. The switch operating member 260 returns to the neutral position when pressing force is no longer applied to the application operating portion 270 and the release operating portion 272. When the switch operating member 260 is at the neutral position, neither an application command nor a release command is output.

Figure 6:
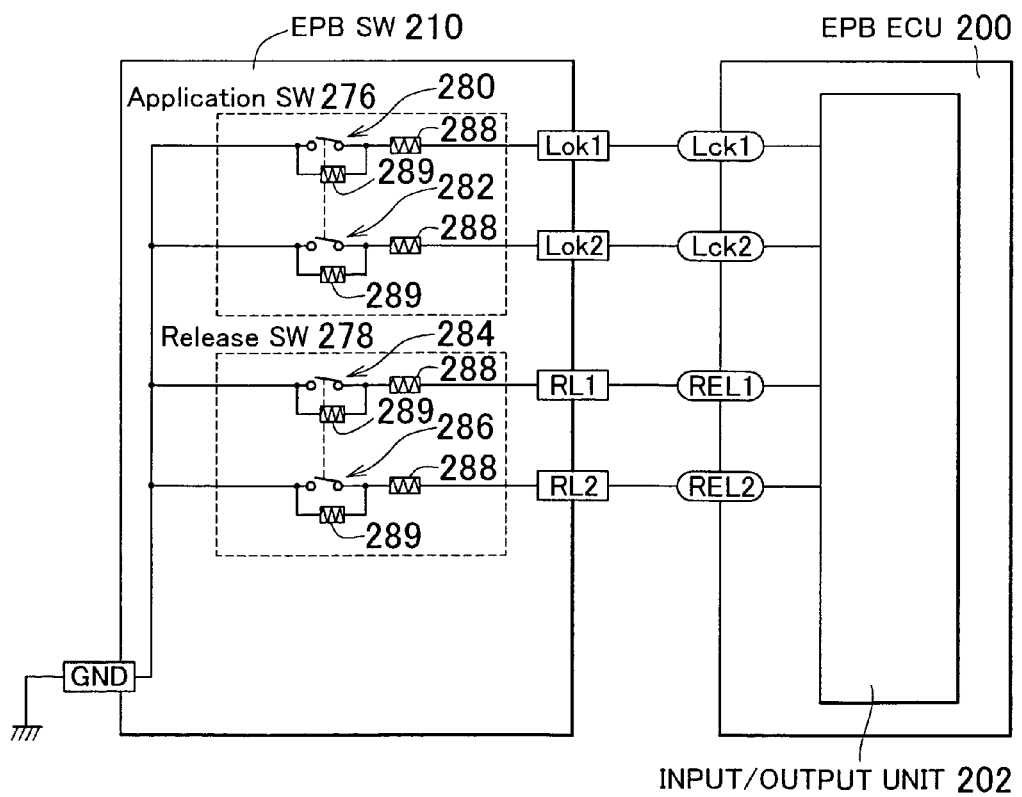
FIG. 6 is a circuit diagram showing the parking switch included in the electric parking brake system according to the embodiment of the invention.

The parking switch 210 includes an application switch 276 and a release switch 278, as shown in FIG. 6. Each of the application switch 276 and the release switch 278 is a redundant switch, and includes two switches. Two switches 280 and 282 included in the application switch 276 are turned on or off (close or open) in response to an operation of the application operating portion 270. In the exemplary embodiment of the invention, electric currents are supplied to a coil (not shown) in response to an operation of the application operating portion 270. Thus, the two switches 280 and 282 are turned on. The switches 280 and 282 are provided between the input/output unit 202 and an earth (ground) in such a manner that the switches 280 and 282 are in series with respective resistances 288 and in parallel to respective resistances 289. The voltages at connection terminals (Lck1, Lck2) of the input/output unit 202 change depending on whether the switches 280 and 282 are on or off. Therefore, whether the switches 280 and 282 are on or off is determined based on the voltages at the connection terminals.

Similarly, two switches 284 and 286 included in the release switch 278 are turned on or off (close or open) in response to an operation of the release operating portion 272. The switches 284 and 286 are provided between the input/output unit 202 and the earth (ground). Whether the switches 284 and 286 are on or off is determined based on the voltages at connection terminals (REL1, REL2) of the input/output unit 202.

When the parking switch 210 is operating properly, the on/off states of the switches 280 and 282 are the same, and the on/off states of the switches 284 and 286 are the same. On the other hand, it is determined that the parking switch 210 malfunctions, if one of the following states occurs when the operating member 260 is operated: 1) the on/off state differs between the switches 280 and 282 (one of the switches 280 and 282 is on, and the other of the switches 280 and 282 is off), 2) the on/off state differs between the switches 284 and 286 (one of the switches 284 and 286 is on, and the other of the switches 284 and 286 is off), 3) all of the switches 280, 282, 284 and 286 are on, and 4) all the switches 280, 282, 284 and 286 are not off, when the operating member 260 is not operated.

Figure 7:
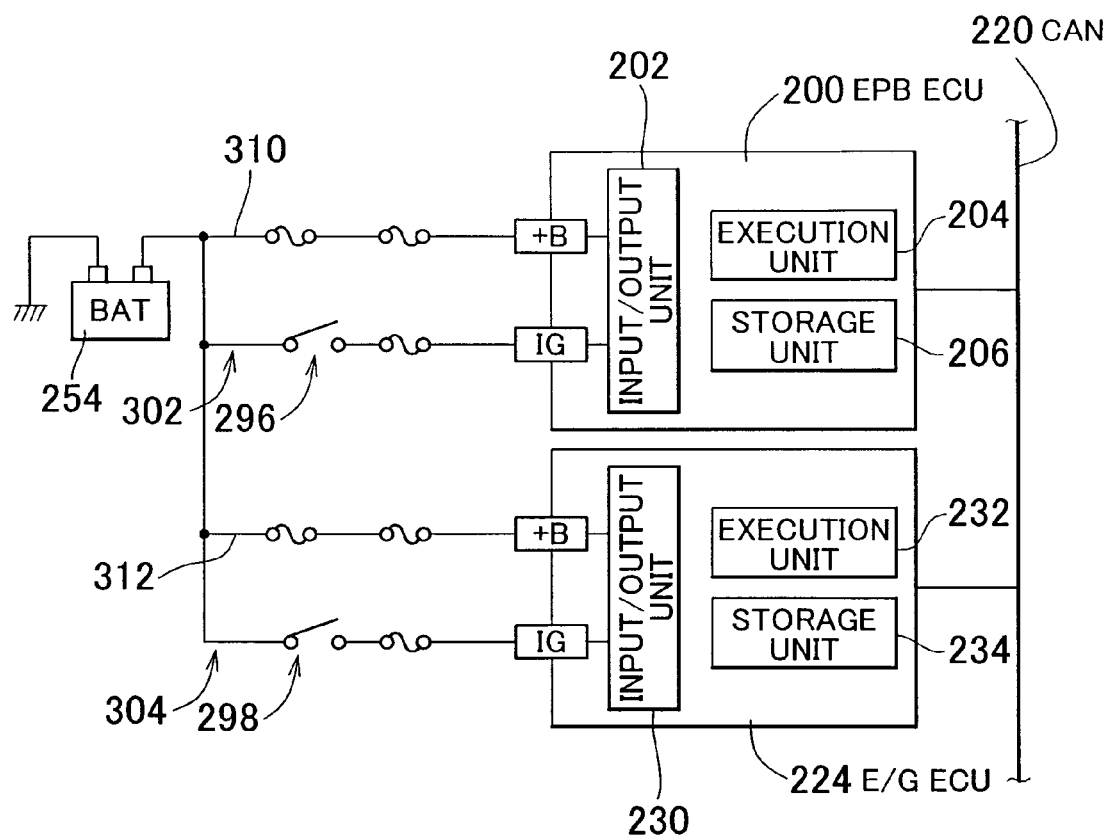
FIG. 7 is a circuit diagram showing a detection circuit that determines whether an ignition switch, included in the electric parking brake system according to the embodiment of the invention, is on or off.

The ignition switch 212 is turned on or off in response to an operation of an operating portion 290 (see FIG. 1) of the ignition switch 212. When the ignition switch 212 is turned on, the engine 150 is usually started. When the ignition switch 212 is turned off, the engine is usually stopped. In the exemplary embodiment of the invention, the ignition switch 212 includes two switches 296 and 298, as shown in FIG. 7. The two switches 296 and 298 are turned on or off (close or open) in response to an operation of the operating portion 290. In the exemplary embodiment of the invention, a coil (not shown) is energized when the operating portion 290 is operated to turn on the ignition switch 212, and the switches 296 and 298 are changed to the on state.

The switch 296 is provided between the battery 254 and the input/output unit 202 of the electric parking brake ECU 200. The switch 298 is provided between the battery 254 and the input/output unit 230 of the engine ECU 224. A detection circuit (electric circuit) 302, in which the battery 254, the switch 296 and the electric parking brake ECU 200 are arranged in series, is formed. A detection circuit (electric circuit) 304, in which the battery 254, the switch 298, the engine ECU 224 are arranged in series, is formed.

When the switches 296 and 298 are on, the terminal voltages become high. On the other hand, when the switches 296 and 298 are off, the terminal voltages become low. Therefore, it is possible to determine whether each of the switches 296 and 298 is on or off based on the terminal voltage. In order to distinguish the two detection circuits 302 and 304 from each other, the electric circuit 302 will be referred to as a "brake control detection circuit", and the electric circuit 304 will be referred to as a "drive control detection circuit".

When both the brake control detection circuit 302 and the drive control detection circuit 304 are operating properly, the result of determination as to whether the ignition switch 212 is on or off, which is made by the electric parking brake ECU 200 is the same as the result of determination as to whether the ignition switch 212 is on or off, which is made in the engine ECU 224. On the other hand, when the engine ECU 224 determines that the ignition switch 212 (the switch 298) is on and the brake ECU 200 determines that the ignition switch 212 (the switch 296) in off, it may be determined that a wire is broken in the brake control detection circuit 302.

In the exemplary embodiment of the invention, the electric parking brake ECU 200 and the engine ECU 224 are connected to the battery 254 via a power source wire 310 and a power source wire 312, respectively, without passing through the ignition switch 212. Therefore, even if the ignition switch 212 is off, the electric parking brake ECU 200 and the engine ECU 224 can be used. Although not shown in the figures, a detection circuit other than the brake control detection circuit 302 and the drive control detection circuit 304 is connected to the meter ECU 229. Whether the ignition switch 212 is on or off also is determined based on the voltage in the other detection circuit.

The operation of the electric parking brake system configured in the above-described manner will be described below. When the application operating portion 270 of the parking switch 210 is operated, an application command is issued, and the brake motor 30 is started. The cables 34 and 36 are pulled, and the parking brakes 18 and 20 are applied.

The brake motor 30 is stopped when the tension of the cable reaches a target tension. At the target tension, the vehicle is maintained at a standstill. Even if supply of electric currents to the brake motor 30 is shut off while the parking brakes 18 and 20 are applied, the forces, with which the friction members are pushed, are maintained in the brakes 18 and 20 by the clutch 82.

If the release operating portion 272 is operated while the parking brakes 18 and 20 are applied, a release command is issued. The brake motor 30 is started, and rotated in the direction opposite to the direction in which the brake motor 30 is rotated when the parking brakes 18 and 20 are applied. The cables 34 and 36 are slackened. The distance between the paired brake shoes 50a and 50b is reduced by the return spring 54 in each of the drum brakes 18 and 20. In this way, the brakes 18 and 20 are released. When the cables 34 and 36 are slackened and the brakes 18 and 20 are released, the brake motor 30 is stopped.

Figure 8:
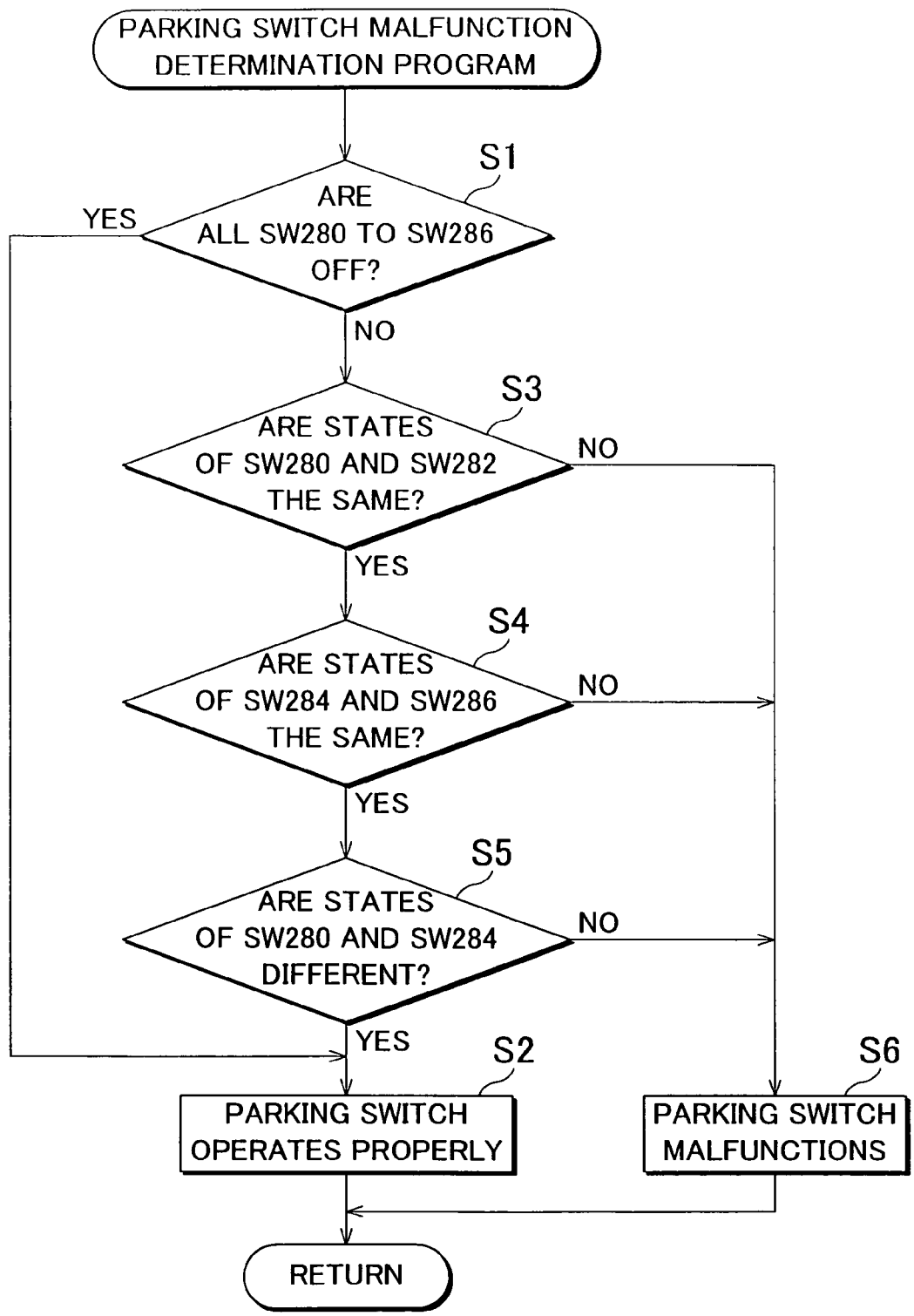
FIG. 8 is a flowchart showing functions performed by a parking switch malfunction determination program stored in a storage unit of an electric parking brake ECU included in the electric parking brake system according to the embodiment of the invention.

Whether the parking switch 210 malfunctions is determined by executing a parking switch malfunction determination program illustrated by a flowchart in FIG. 8. The parking switch malfunction determination program is executed by the electric parking brake ECU 200 at predetermined time intervals. A parking switch malfunction determination unit is implemented by the electric parking brake ECU 200 and the brake control detection circuit 302 according to the exemplary embodiment of the invention.

In step (hereinafter, referred to as "S") 1, it is determined whether all the switches 280 to 286 are off. When all the switches 280 to 286 are off, an affirmative determination is made, and it is determined in S2 that the parking switch 210 is operating properly. When neither the application operating portion 270 nor the release operating portion 272 has been pressed, all the switches 280 to 286 should be off. Therefore, when all the switches 280 to 286 are off, it is determined that the parking switch 210 is operating properly.

On the other hand, when it is determined that not all the switches 280 to 286 are off, it is determined in S3 whether the switches 280 and 282 are in the same state, and it is determined in S4 whether the switches 284 and 286 are in the same state. When affirmative determinations are made in both S3 and S4, it is determined in S5 whether the state of the switch 280 and the state of the switch 284 are different from each other. When affirmative determinations are made in all S3 to S5, both the switches 280 and 282 are on and both the switches 284 and 286 are off, or both the switches 280 and 282 are off and both the switches 284 and 286 are on. Therefore, it is considered that one of the application operating portion 270 and the release operating portion 272 has been operated. In this case, it is determined in S2 that the switch 210 is operating properly. In contrast, when a negative determination is made in one of S3 to S5, it is determined in S6 that the parking switch 210 malfunctions.

A flowchart in FIG. 9 shows functions of a wheel speed obtaining program. The wheel speed obtaining program is executed by the electric parking brake ECU 200 at predetermined time intervals. The information indicating the wheel speed is provided from the skid control ECU 228 to the electric parking brake ECU 200. Also, as described above, the information indicating the wheel speed is provided to the electric parking brake ECU 200 while the ignition switch 212 is on. However, provision of the information indicating the wheel speed is stopped when the ignition switch 212 is turned off.

In S31, it is determined whether the electric parking brake ECU 200 has received the information indicating the wheel speed via the CAN 220. When the information indicating the wheel speed has been received, it is read in S32 and stored in S33. The information indicating the newest information indicating the wheel speed is stored. When the ignition switch 212 is off, the wheel speed, which is detected immediately before the operation of the operating portion 290 for turning off the ignition switch 212 is performed, is used.

As described above, when the information indicating the representative value of the wheel speeds of the front right wheel, the front left wheel, the rear right wheel and the rear left wheel is transmitted from the skid control ECU 228, or when the information indicating the vehicle traveling speed is transmitted, if the speed is equal to or lower than the predetermined speed at which the vehicle is estimated to be at a standstill, it is determined that the vehicle is at a standstill. On the other hand, when the information indicating all the wheel speeds of the wheel speeds of the front right wheel, the front left wheel, the rear right wheel and the rear left wheel is transmitted, the maximum value or the average value of the wheel speeds, or the vehicle traveling speed is obtained by the electric parking brake ECU 200. When the value obtained by the electric parking brake ECU 200 is equal to or lower than the predetermined value at which the vehicle is estimated to be at a standstill, it is determined that the vehicle is at a standstill.

A parking brake control program shown by a flowchart in FIG. 10 is executed by the electric parking brake ECU 200 at predetermined time intervals. In S51, it is determined whether the parking switch 210 is operating properly. When it is determined that the parking switch 210 is operating properly, an affirmative determination is made, and S52 is executed. In the following steps, a regular parking brake control is executed. In S52, it is determined whether an application command has been issued. In S53, it is determined whether a release command has been issued. When neither the application operating portion 270 nor the release operating portion 272 has been operated, negative determinations are made in both S52 and S53. Then, S51 to S53 are periodically executed.

When the application operating portion 270 has been operated and an application command has been issued, an affirmative determination is made in S52, and the parking brakes 18 and 20 are applied in S54. When the release operating portion 272 has been operated and a release command has been issued, an affirmative determination is made in S53 and the parking brakes 18 and 20 are released in S55.

In contrast, when the parking switch 210 malfunctions, a negative determination is made in S51 and S56 and the following steps are executed. In this case, the parking brakes 18 and 20 are not operated (the brake motor 30 is not controlled) based on the state of the parking switch 210.

In S56, it is determined whether the parking brakes 18 and 20 have been applied. When the parking brakes 18 and 20 have not been applied, a negative determination is made, and it is determined in S57 whether the wheel speed sensor 250 is operating properly. When a determination as to whether the wheel speed sensor 250 is operating properly has already been made, for example, in the initial check, the result is read. When a determination as to whether the wheel speed sensor 250 is operating properly has not been made, it is determined in S57 whether the wheel speed sensor 250 is operating properly. Whether the wheel speed sensor 250 is operating properly is determined by the skid control ECU 228, and the information indicating the determination result is provided to the electric parking brake ECU 200.

Figure 11:
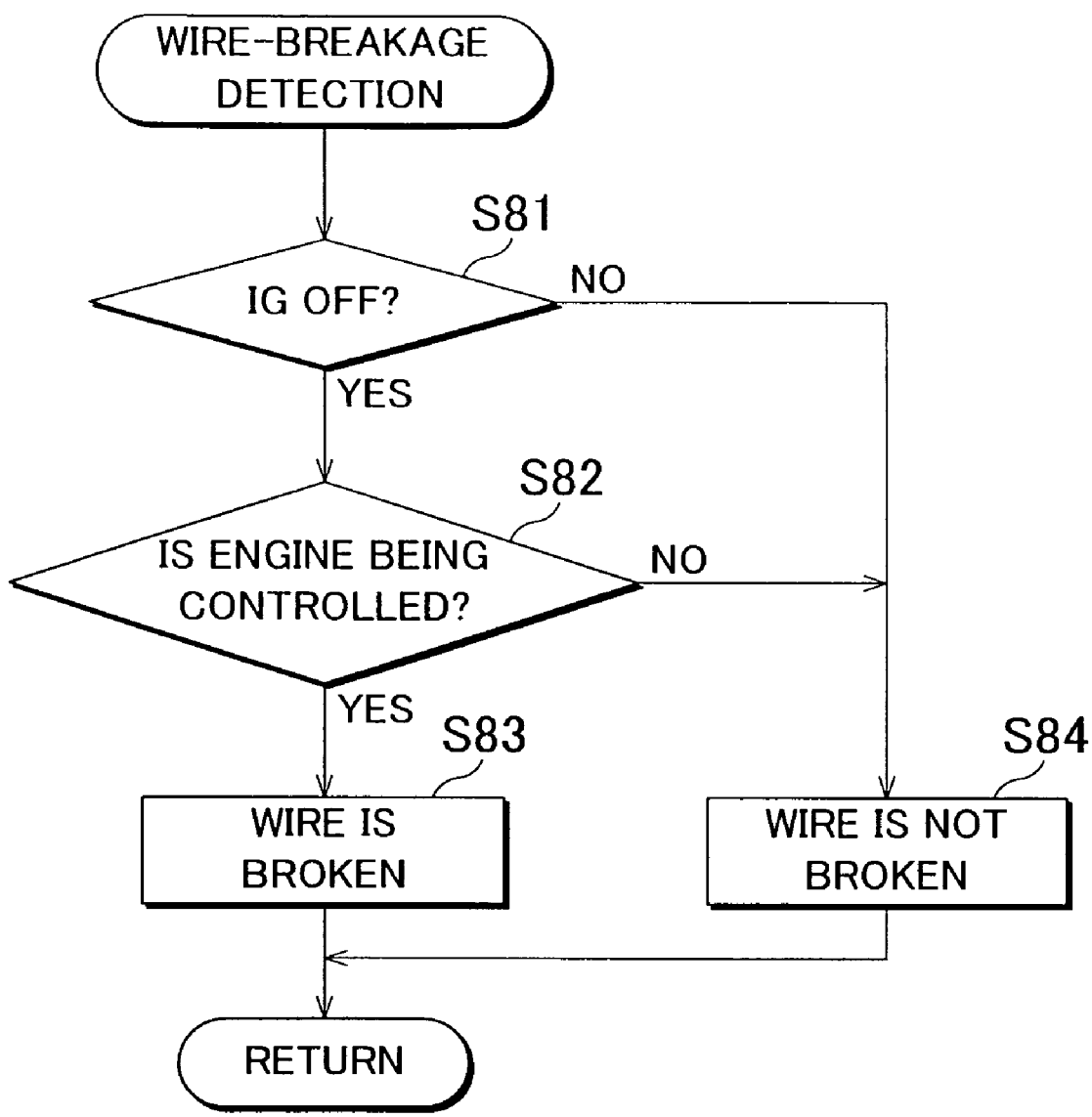
FIG. 11 is a flowchart showing functions performed by a part of the parking brake control program according to the embodiment of the invention.

When the wheel speed sensor 250 is operating properly, it is determined in S58 whether a wire in the brake control detection circuit 302 has been broken. As shown by the routine in FIG. 11, it is determined in S81 whether the ignition switch 212 (the switch 296) is off based on the voltage at the brake control detection circuit 302. When it is determined that the ignition switch 212 is off, it is determined in S82 whether the information from the engine ECU 224 indicates that the ignition switch 212 is on, namely, whether the engine control program is executed.

Whether the ignition switch 212 (the switch 298) is on or off is determined by the engine ECU 224 based on the voltage at the drive control detection circuit 304. When it is determined that the ignition switch 212 is on, the engine 150 is controlled. Therefore, when it is determined that the ignition switch 212 is off by the electric parking brake ECU 200, and it is determined that the ignition switch 212 is on by the engine ECU 224 (when affirmative determinations are made in both S81 and S82), it is determined in S83 that a wire in the brake control detection circuit 302 has been broken.

On the other hand, when the electric parking brake ECU 200 determines that the ignition switch 212 is on (a negative determination is made in S81), or when both the electric parking brake ECU 200 and the engine ECU 244 determine that the ignition switch 212 is off, namely, when the engine 150 is not controlled (when an affirmative determination is made in S81 and a negative determination is made in S82), it is determined in S84 that the wire in the brake control detection circuit 302 has not been broken.

In the vehicle in which an idling stop control is not executed, when the engine 150 is being controlled, the engine 150 is operating. When the engine 150 is operating, the engine 150 is being controlled, and it is determined that the switch 298 is on. When the engine 150 is not operating, the engine 150 is not being operated, and it is determined that the switch 298 is off.

In contrast, in the vehicle in which the idling stop control is executed, even when the engine 150 is not operating, the switch 298 is not always off. In this case, when the engine control program is executed by the engine ECU 224, it is determined that the switch 298 is on.

In S59, it is determined whether the determination result made in S58 indicates that the wire in the circuit has been broken. When it is determined that the wire in the circuit has not been broken, namely, when the circuit is operating properly, a negative determination is made in S59. Then, it is determined whether the ignition switch 212 is off based on the voltage at the brake control detection circuit 302. When the ignition switch 212 is on, a negative determination is made in S60. When the ignition switch 212 is on, S51 and S56 to S60 are periodically executed. During this period, the parking brakes 18 and 20 are not applied.

Then, when the ignition switch 212 is turned off, an affirmative determination is made in S60. In S61, it is determined whether the vehicle is at a standstill based on the wheel speed stored in the electric parking brake ECU 200. It is determined whether the vehicle is at a standstill when the ignition switch 212 is turned off, namely, immediately before the operation for turning off the ignition switch 212 is performed. When it is determined that the vehicle is at a standstill at this time, an affirmative determination is made in S61, and the parking brakes 18 and 20 are applied in S54. On the other hand, when it is determined that the vehicle is not at a standstill when the ignition switch 212 is turned off, the parking brakes 18 and 20 are not applied automatically. The operating portion 290 of the ignition switch 212 is sometimes operated to turn off the ignition switch 212 while the vehicle is running, for example, in order to increase the fuel efficiency. In such a case, it is not desirable to apply the parking brakes 18 and 20.

On the other hand, when it is determined that a wire in the brake control detection circuit 302 has been broken, an affirmative determination is made in S59. In this case, the engine 150 is operative. Therefore, the parking brakes 18 and 20 are not applied automatically. In the exemplary embodiment of the invention, when the engine 150 is operative, it is determined that a wire has been broken. When a wire has been broken, the ignition switch 212 is on.

When the parking brakes 18 and 20 have already been applied, an affirmative determination is made in S56, and it is determined in S62 whether the driver has an intention to start the vehicle. In the exemplary embodiment of the invention, a series of the following operations are performed and the engine torque is equal to or higher than a predetermined value, it is determined that the driver intends to start the vehicle. The clutch 152 is disengaged when the clutch pedal 156 is depressed, and the shift position of the manual transmission 10 is changed in response to an operation of the shifting operation member 154 (when Neutral has been selected, the shift position is changed to another shift position). Then, the clutch pedal 156 is fully released to engage the clutch 152. In addition, the accelerator operating member 238 is depressed. In some cases, it is determined that the series of the above-described operations are performed, after it is determined that the ignition switch 212 is turned on. In the other cases, it is determined that the series of operations are performed when it has not been determined that the ignition switch 212 is turned on. In any one of these cases, when it is determined that the driver intends to start the vehicle, an affirmative determination is made in S62, and the brakes are automatically released in S55. When it is not determined that the driver intends to start the vehicle, a negative determination is made in S62, and the parking brakes 18 and 20 are kept applied.

As described above, in the exemplary embodiment of the invention, even if the parking switch 210 malfunctions, the parking brakes 18 and 20 are automatically applied when the operating portion 290 of the ignition switch 212 is operated to turn off the ignition switch 212 while the vehicle is at a standstill. Therefore, in the vehicle including the manual transmission 10, even if the parking switch 210 malfunctions, the vehicle is appropriately maintained at a standstill without defying the driver's intention. A parking brake automatic control unit according to aspects of the invention is implemented by the electric parking brake ECU 200.

JP-A-2001-106047 describes automatically applying the parking brakes when the ignition switch is turned off in the vehicle including a manual transmission. However, JP-A-2001-106047 has no description concerning the case where a malfunction occurs in the parking switch. JP-A-2001-106047 has no description concerning fail-safe operations.

As described above, according to JP-A-2001-106057, when the parking switch malfunctions, if the vehicle is at a standstill, the parking brakes are automatically applied. However, if the parking brakes are always applied automatically when the vehicle is at a standstill, the parking brakes are frequently applied, which is not desirable. For example, in a cold district, the parking brakes are applied against the driver's intention. JP-A-2001-106057 has no description concerning application of the described technology to a vehicle including a manual transmission.

JP-A-2001-106058 describes automatically applying or releasing the parking brakes when the parking switch malfunctions, based on a combination of part or all of the operation of a starter switch, the operation of a shift lever, the operation of the brake pedal and the operation of the accelerator pedal. However, JP-A-2001-106058 has no detailed description concerning the operation of the starter switch. Also, JP-A-2001-106058 has no description concerning application of the described technology to a vehicle including a manual transmission.

According to the exemplary embodiment of the invention, in the electric parking brake system for a vehicle including a manual transmission, if the parking switch 210 malfunctions, the parking brakes 18 and 20 are automatically applied when the ignition switch 212 is turned off in response to an operation of the operating portion 290 of the ignition switch 212. In the electric parking brake system according to the exemplary embodiment of the invention, even if the parking switch 210 malfunctions, the parking brakes 18 and 20 are automatically applied without defying the driver's intention, and the vehicle including the manual transmission 10 is appropriately maintained at a standstill.

In addition, according to the exemplary embodiment of the invention, a determination as to whether the wire in the brake control detection circuit 302 has been broken and a determination as to whether the ignition switch 212 is off are made independently of each other. Accordingly, if it is determined that the ignition switch 212 is off based on an electric signal from the brake control circuit 302, it is possible to determine whether the ignition switch 212 has been turned off in response to an operation of the operating portion 290. Therefore, even if the brake control detection circuit 302 malfunctions, it is possible to accurately determine whether the operating portion 290 of the ignition switch 212 has been operated by the driver to turn off the ignition switch 212. Accordingly, it is possible to appropriately avoid the situation in which the parking brakes 18 and 20 are automatically applied against the driver's intention.

With the electric parking brake system according to the exemplary embodiment of the invention, if the parking switch 210 malfunctions, the parking brakes 18 and 20 are automatically applied when the operating portion 290 of the ignition switch 212 is operated to turn off the ignition switch 212 while the vehicle is at a standstill. With the electric parking brake system according to the exemplary embodiment of the invention, the frequency at which the parking brakes 18 and 20 are applied when the parking switch 210 malfunctions is reduced. Therefore, it is possible to appropriately avoid the situation in which the parking brakes 18 and 20 are automatically applied against the driver's intention. It is possible to avoid the situation where the parking brakes 18 and 20 are automatically applied when the operating portion 290 of the ignition switch 212 is operated to turn off the ignition switch 212 while the vehicle is moving. Therefore, it is possible to appropriately avoid the situation where the parking brakes 18 and 20 are not easily released because they are automatically applied in a cold district and are frozen.

With the electric parking brake system according to the exemplary embodiment of the invention, when the parking switch 210 malfunctions, the parking brakes 18 and 20 are automatically applied based on the information from the engine ECU 224. The engine ECU 224 determines whether the ignition switch 212 is on or off based on an electric signal from the drive control detection circuit 304 that is arranged separately from the brake control detection circuit 302. Therefore, it is appropriate to determine whether the ignition switch 212 is on or off based on the information from the engine ECU 224. According to the exemplary embodiment of the invention, even if the wire in the brake control detection circuit 302 has been broken, it is possible to accurately determine whether the ignition switch 212 is on or off. Therefore, it is possible to appropriately avoid the situation where the parking brakes 18 and 20 are automatically applied against the driver's intention.

Figure 10A:
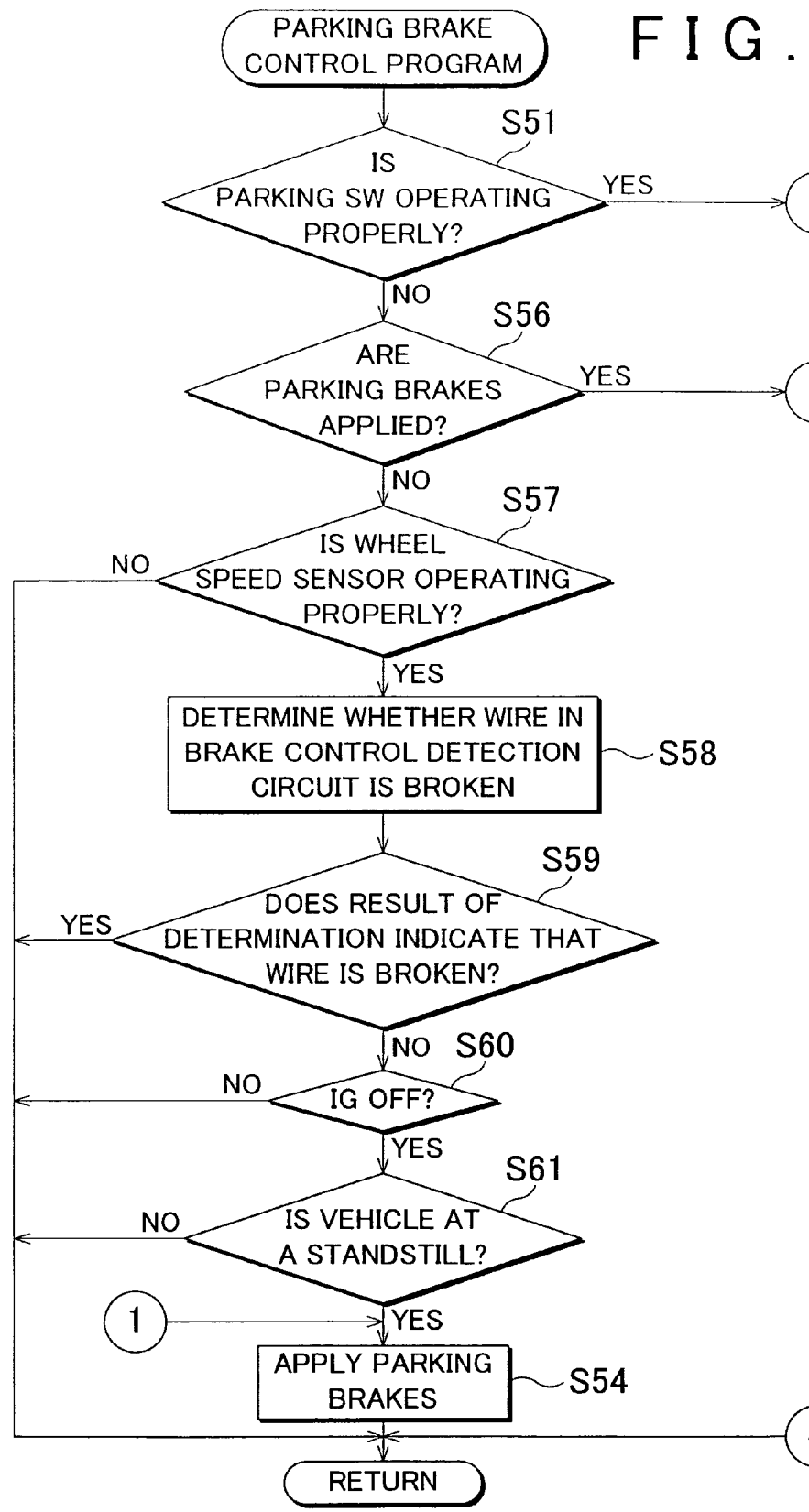
FIGS. 10A and 10B are flowcharts showing functions performed by a parking brake control program stored in the storage unit according to the embodiment of the invention.
Figure 10B:
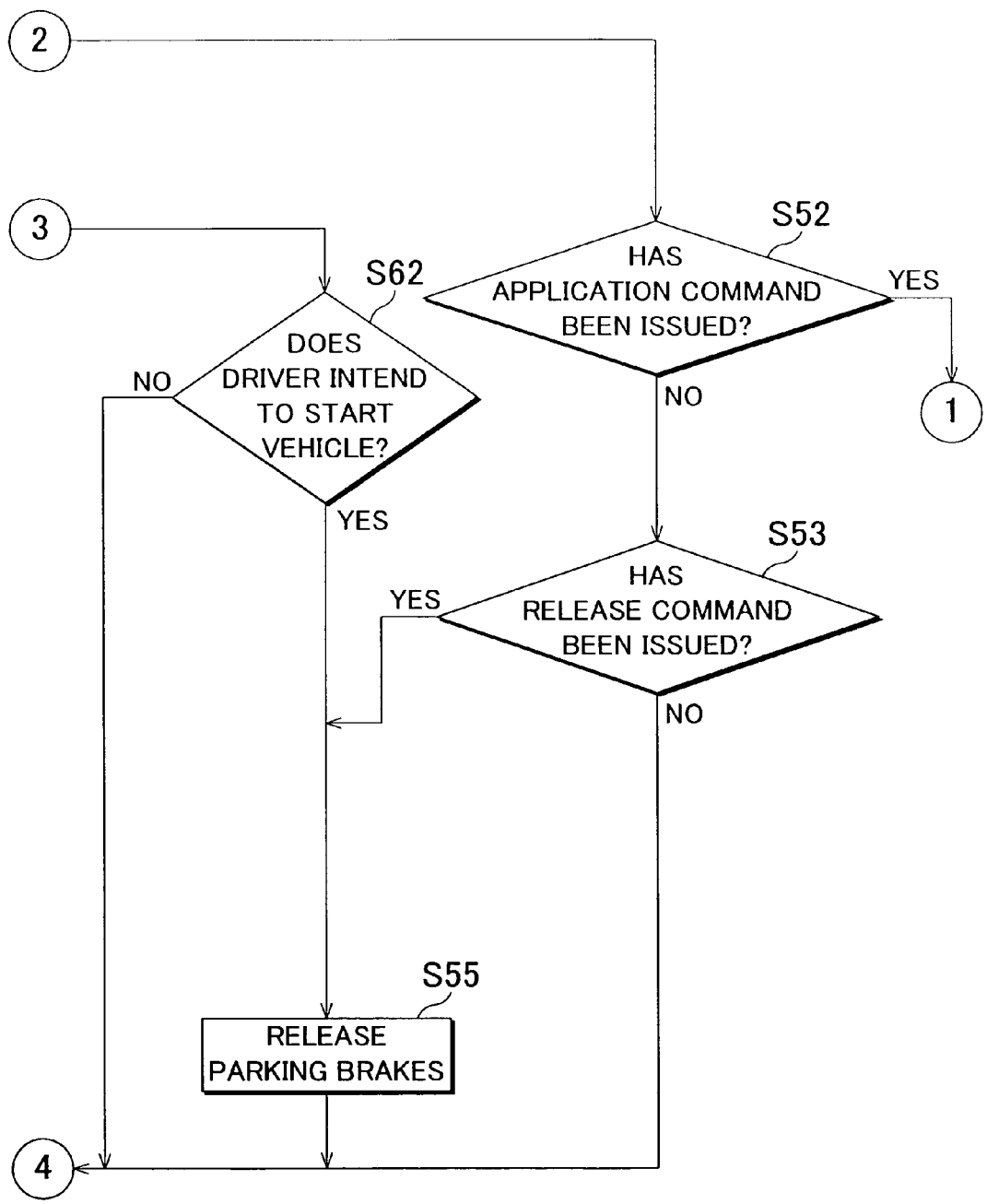

In the exemplary embodiment of the invention described above, the brake control detection circuit 302, a unit of the electric parking brake ECU 200, which stores S51 and S54 to S62 of the parking brake control program shown by the flowchart in FIG. 10, a unit of the electric parking brake ECU 200, which executes S51 and S54 to S62 of the parking brake control program shown by the flowchart in FIGS. 10A and 10B, etc. function as a parking brake automatic control unit. In the parking brake automatic control unit, a unit that stores S58 (a wire-breakage determination routine shown by the flowchart in FIG. 11), S59, and S60, a unit that executes S58, S59 and S60, etc. function as a wire-breakage/off state determination unit. In the wire-breakage/off state determination unit, a unit that stores S58, a unit that executes S58, etc. function as a wire-breakage determination unit.

In the parking brake automatic control unit, a unit that stores S59, a unit that executes S59 (S54 is not executed when an affirmative determination is made in S59), etc. function as a during-control application preventing unit. A unit that stores S60, S61, and S54, a unit that executes S60, S61 and S54, etc. function as a during-standstill off-operation-time applying unit. A unit that stores S59, S60 and S54, a unit that executes S59, S60 and S54, etc. function as an off-state detection-time applying unit.

In addition, the parking switch 210, a unit of the electric parking brake ECU 200, which stores the parking switch malfunction determination program shown by the flowchart in FIG. 8, a unit of the electric parking brake ECU 200, which executes the parking switch malfunction determination program shown by the flowchart in FIG. 8, etc. function as a parking switch malfunction determination unit. In the exemplary embodiment of the invention, the engine 150 is used as the drive power source, and the engine ECU 224, the drive control detection circuit 304, etc. function as a drive control unit.

In the exemplary embodiment of the invention, when it is determined that a series of operations such as the operation of the clutch pedal 156, the operation of the shifting operation member 154, the operation of the accelerator operating member 238 are performed, and the engine torque becomes equal to or higher than a predetermined value, it is determined that the driver intends to start the vehicle. Alternatively, when it is determined that at least one of the depression of the accelerator operating member 238, the operation of the clutch pedal 156 and the operation of the shifting operation member 154 is performed, it is determined that the driver intends to start the vehicle. Further alternatively, when it is determined that at least one of the above-described operations is performed and the engine torque becomes equal to or higher than a predetermined value, it is determined that the driver intends to start the vehicle.

In the exemplary embodiment of the invention, the electric parking brake system is applied to the vehicle in which the shifting operation member 154 is connected to the manual transmission 10. Alternatively, the electric parking brake system may be applied to a vehicle in which the shifting operation member 154 is not connected to the manual transmission 10. The operation position of the shifting operation member 154 is detected, and the gear train in the manual transmission 10 is changed based on the detected operation position of the shifting operation member 154 by operating the electric motor. The electric parking brake system may be applied to a vehicle including an automatic transmission.

When the wheel speed can be detected even after the ignition switch 212 is turned off, the wheel speed or the vehicle traveling speed is read from the information, provided from the skid control ECU 228, when S61 is executed, and it is determined whether the vehicle is at a standstill based on the wheel speed or the vehicle traveling speed that is read when S61 is executed.

In addition, the drive power source is not limited to an engine. The electric parking brake system may be applied to a hybrid vehicle including a drive power source that includes an electric motor, or an electric vehicle provided with drive power sources that include an electric motor. The electric parking brake system may also be applied to an electric vehicle in which an electric motor is used as a drive power source. An electric motor that is used as a drive power source is usually not operating when the vehicle is at a standstill. Therefore, when the brake control detection circuit 302 malfunctions, the parking brakes 18 and 20 are applied based on the information that the ignition switch 212 is on, the information that the electric motor control program is executed, etc., which are provided from the drive control unit.

It is possible to determine whether the ignition switch 212 is on or off, not based on the information provided from the engine ECU 224, but based on another ECU, for example, the meter ECU 229, which includes a detection circuit that determines whether the ignition switch 212 is on or off. In addition, the invention may be implemented in various other embodiments. For example, whether a wire in the brake control detection circuit 302 has been broken may be determined, or the parking brakes 18 and 20 may be applied based on the information provided from multiple ECUs such as the engine ECU 224 and the meter ECU 229. Thus, the invention is intended to cover various modifications and arrangements based on the knowledge of those who are skilled in the art.

In addition, the electric parking brake system may include: an electric parking brake mechanism that includes brakes which suppress rotation of the wheels and an electric motor that applies or releases the brakes, and that maintains the vehicle at a standstill when the brakes are applied; a parking switch that selectively outputs an application command for applying the brakes and a release command for releasing the brakes in response to an operation of the operating portion for the parking switch; a parking switch malfunction determination unit that determines whether the parking switch malfunctions; and a parking brake automatic control unit that automatically applies the brakes when the parking switch malfunction determination unit determines that the parking switch malfunctions and the ignition switch of the vehicle is turned off in response to an operation of the operating portion for the ignition switch while the vehicle is at a standstill.

In the electric parking brake system described above, when it is determined that the parking switch malfunctions, if the ignition switch is off and the vehicle is at a standstill, the parking brakes are automatically applied. The electric parking brake system described above may be applied to a vehicle including an automatic transmission.

A vehicle may be provided with a manual transmission and an electric parking brake system that includes a) an electric parking brake mechanism that includes brakes which suppress rotation of the wheels and an electric motor which applies or releases the brakes, and that maintains the vehicle at a standstill when the brakes are applied, b) a parking switch that selectively outputs an application command for applying the brakes and a release command for releasing the brakes in response to an operation of an operating portion for the parking switch, c) a parking switch malfunction determination unit that determines whether the parking switch malfunctions, and d) a parking brake automatic control unit that automatically applies the brakes by operating the electric motor if the ignition switch is turned off in response of an operation of the operating portion for the ignition switch when the parking switch malfunction determination unit determines that the parking switch malfunctions.

The vehicle may further include a drive power source, and a drive control unit that includes a) a drive control detection circuit that is an electric circuit which determines whether the ignition switch of the vehicle is on or off, b) a drive control unit that controls the drive power source when it is determined that the ignition switch is kept on, based on an electric signal from the drive control detection circuit, and c) an information provision unit that provides the parking brake automatic control unit with the information indicating whether the ignition switch is on or off, which is determined based on an electric signal from the drive control detection circuit.

A vehicle may include an automatic transmission and an electric parking brake system that includes a) an electric parking brake mechanism that includes brakes which suppress rotation of wheels and an electric motor which applies or releases the brakes, and that maintains the vehicle at a standstill, b) a parking switch that selectively outputs an application command for applying the brakes and a release command for releasing the brakes in response to an operating portion for the parking switch, c) a parking switch malfunction determination unit that determines whether the parking switch malfunctions, and d) a parking brake automatic control unit that automatically applies the brakes by operating the electric motor if the ignition switch of the vehicle is turned off in response to an operation of the operating portion for the ignition switch when the parking switch malfunction determination unit determines that the parking switch malfunctions.

What is claimed is:

1. An electric parking brake system provided in a vehicle that includes a manual transmission, comprising:
   an electric parking brake mechanism that includes a brake which suppresses rotation of a wheel and an electric motor which applies or releases the brake, and that maintains a vehicle at a standstill while the brake is applied;
   a parking switch that selectively outputs an application command for applying the brake and a release command for releasing the brake in response to an operation of an operating portion for the parking switch;
   a parking switch malfunction determination unit that determines whether the parking switch malfunctions; and
   a parking brake automatic control unit that automatically applies the brake by operating the electric motor when an ignition switch of the vehicle is turned off in response to an operation of an operating portion for the ignition switch, in a case where the parking switch malfunction determination unit determines that the parking switch malfunctions.

2. The electric parking brake system according to claim 1, wherein the parking brake automatic control unit includes: (i) a brake control detection circuit which is an electric circuit that determines whether the ignition switch is on or off; (ii) a wire-breakage/off-state determination unit that determines whether a wire in the brake control detection circuit is broken and determines whether the ignition switch is off independently of each other, and (iii) an off-state detection-time applying unit that automatically applies the brake when the wire-breakage/off-state determination unit determines that the ignition switch is off.

3. The electric parking brake system according to claim 2, wherein the parking brake automatic control unit includes a during-standstill off-operation-time applying unit that automatically applies the brake when the ignition switch of the vehicle is turned off in response to an operation of the operating portion for the ignition switch while the vehicle is at a standstill.

4. The electric parking brake system according to claim 2, further comprising:
   a drive control unit that controls a drive power source of the vehicle, wherein:
   the drive control unit includes a drive control detection circuit which is an electric circuit that is arranged separately from the brake control detection circuit and that determines whether the ignition switch is on or off; and
   the wire-breakage/off-state determination unit includes a wire-breakage determination unit that determines that the wire in the brake control detection circuit is broken when an electric signal from the brake control detection circuit indicates that the ignition switch is off whereas information from the drive control unit indicates that the ignition switch is on.

5. The electric parking brake system according to claim 4, wherein the parking brake automatic control unit includes a during-standstill off-operation-time applying unit that automatically applies the brake when the ignition switch of the vehicle is turned off in response to an operation of the operating portion for the ignition switch while the vehicle is at a standstill.

6. The electric parking brake system according to claim 1, wherein the parking brake automatic control unit includes (i) a brake control detection circuit which is an electric circuit that determines whether the ignition switch is on or off and (ii) a during-control application preventing unit that prevents the brake from being automatically applied when the drive power source of the vehicle is controlled by the drive control unit whereas an electric signal from the brake control detection circuit indicates that the ignition switch is off.

7. The electric parking brake system according to claim 6, wherein the parking brake automatic control unit includes a during-standstill off-operation-time applying unit that automatically applies the brake when the ignition switch of the vehicle is turned off in response to an operation of the operating portion for the ignition switch while the vehicle is at a standstill.

8. The electric parking brake system according to claim 1, wherein the parking brake automatic control unit includes a during-standstill off-operation-time applying unit that automatically applies the brake when the ignition switch of the vehicle is turned off in response to an operation of the operating portion for the ignition switch while the vehicle is at a standstill.

* * * * *